May 1, 1934.  F. W. BORDEN  1,956,822

STEREOSCOPE

Filed May 11, 1931

INVENTOR,
FRED W. BORDEN.
BY Donald K. Lippincott
ATTORNEY.

Patented May 1, 1934

1,956,822

UNITED STATES PATENT OFFICE 1,956,822

STEREOSCOPE

Fred W. Borden, San Francisco, Calif.

Application May 11, 1931, Serial No. 536,480

8 Claims. (Cl. 88—29)

My invention relates to stereoscopes, and particularly to stereoscopes for examining X-ray film.

Among the objects of my invention are: To provide a stereoscope wherein the production of the stereoscopic effect is not dependent upon adjustment or manipulation by the observer; to provide a stereoscope wherein the observation of the stereoscopic effect is independent of skill or practice by the observer; to provide a device in which a stereoscopic effect is simultaneously observable, under the same conditions, by a plurality of observers, for purposes of consultation and the like; to provide a stereoscope which may be used for long periods with a minimum of eye strain; and to provide a stereoscope wherein the stereoscopic image is not dimmed or confused by undesired secondary reflections.

Other objects of my invention will be apparent or will be specifically pointed out in the description forming a part of this specification, but I do not limit myself to the embodiment of my invention herein described, as various forms may be adopted within the scope of the claims.

The use of stereoscopic images in X-ray examinations and diagnosis has long been known. The stereoscopic pairs of films are produced successively, by moving the target or focal point of the X-ray tube, the inter-pupillary distance of about two and one-half inches between the exposures. Plate or film holders are provided for positioning the plate accurately within the same field for the two exposures.

The stereoscopic pairs of pictures have usually been used in some modification of the Wheatstone stereoscope, which comprises a pair of illuminating boxes facing each other at the ends of a bench or table which is usually from four to six feet long. Midway between the two light boxes is mounted a pair of 45° mirrors, which reflect the images into the eyes of the observer in an approximately superposed position. In order to accommodate for the eyes of different observers it has been customary to provide many adjustments on the stereoscope. Thus, the angle between the viewing mirrors, the position of these mirrors in the median plane between the two light boxes, the angle of the light boxes, and other of the dimensions involved, have all been brought under the adjustment of the operator to aid him in securing the stereoscopic effect.

Considerable skill is required in order to do this. The fields of view occupied by the two images must be exactly superposed and in the same plane, but since the adjustments are made subjectively this is seldom attained. Usually, the images as seen by the two eyes are either slightly out of plane, or slightly out of superposition, and failure to meet the theoretical condition is compensated for by dissociating the convergence and accommodation of the eyes and by other efforts of the eye muscles. The result is an eye strain which may be serious, and some observers find it practically impossible to obtain the stereoscopic effect.

Furthermore, it is seldom that two observers can obtain the effect with the same adjustment. It is frequently necessary that the pictures be examined by more than one observer for purposes of consultation or otherwise, and as a result it is almost always necessary that adjustments be made between viewing, with an ensuing doubt that the two observers have seen exactly the same thing.

Broadly considered, my invention comprises a table, preferably although not necessarily comprising a transparent top with a light box beneath for illuminating the film. On the table are guide means for positioning each film in a definitely predetermined field of view. Mounted above the table is a hood within which are arranged a pair of oppositely inclined objective mirrors for reflecting the field, and on the median plane between these objective mirrors a second pair of eyepiece mirrors for reflecting the images of the field in the objective mirrors to the observer, the arrangement of the mirrors being such that the virtual images of the fields of view in the eyepieces are accurately superposed in space.

The eyepiece arrangement is preferably duplicated on the two sides of the hood, so that two observers may view the same stereoscopic image at the same time. "First surface" or front silvered mirrors are preferably used for both the eyepiece and the objective. The hood is preferably completely enclosed, to prevent injury to the first surface mirrors, and is opaque with the exception of windows arranged in the paths of the light rays from the fields of view to the observer. Eyeholes or other positioning means are provided adjacent the top of the hood to insure the correct positioning of the observer's eyes.

In order to prevent reflection from the window surfaces and other secondary reflection which might confuse the observed images, partitions are placed between the two mirrors of the pair comprising each eyepiece, and diaphragms are also placed between each objective and its corresponding eyepiece, the apertures in the diaphragms being shaped to limit the images in the eyepiece to the desired fields of view. Shutters are provided for further delimiting these fields when the pictures under examination are not large enough to occupy their entire area, the shutters defining the width of the field preferably being under a single control for both eyepieces, while those defining the length of the field are individually controllable for the separate eyepieces.

Referring to the drawing.

Figure 1:
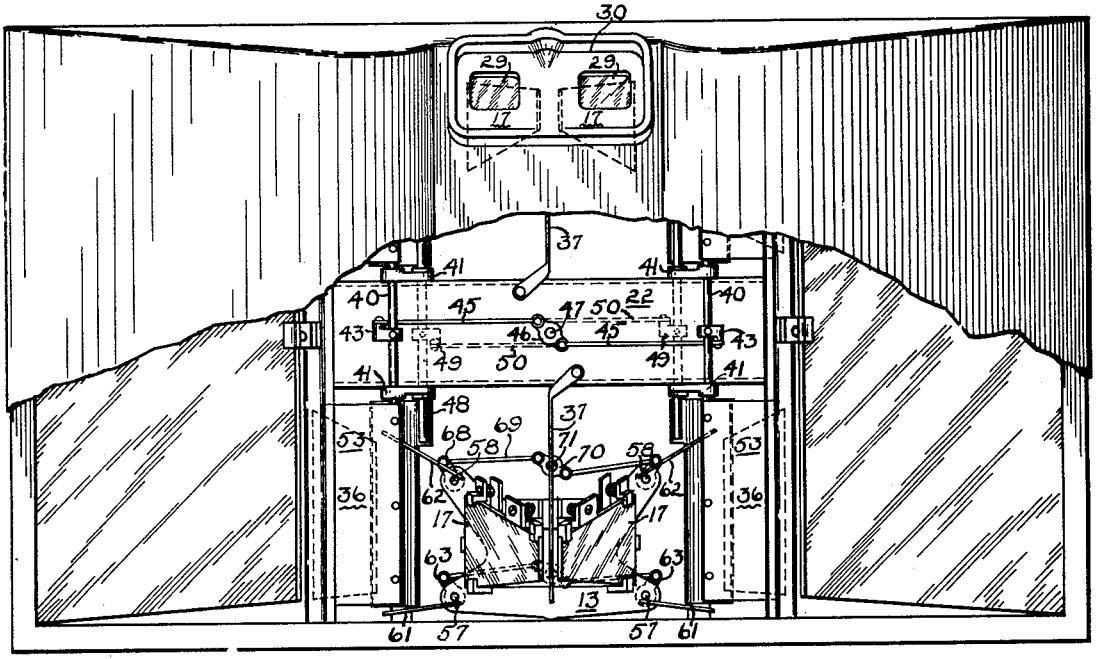
Figure 1 is a plan view of a double-viewing stereoscope embodying my invention.
Figure 2:
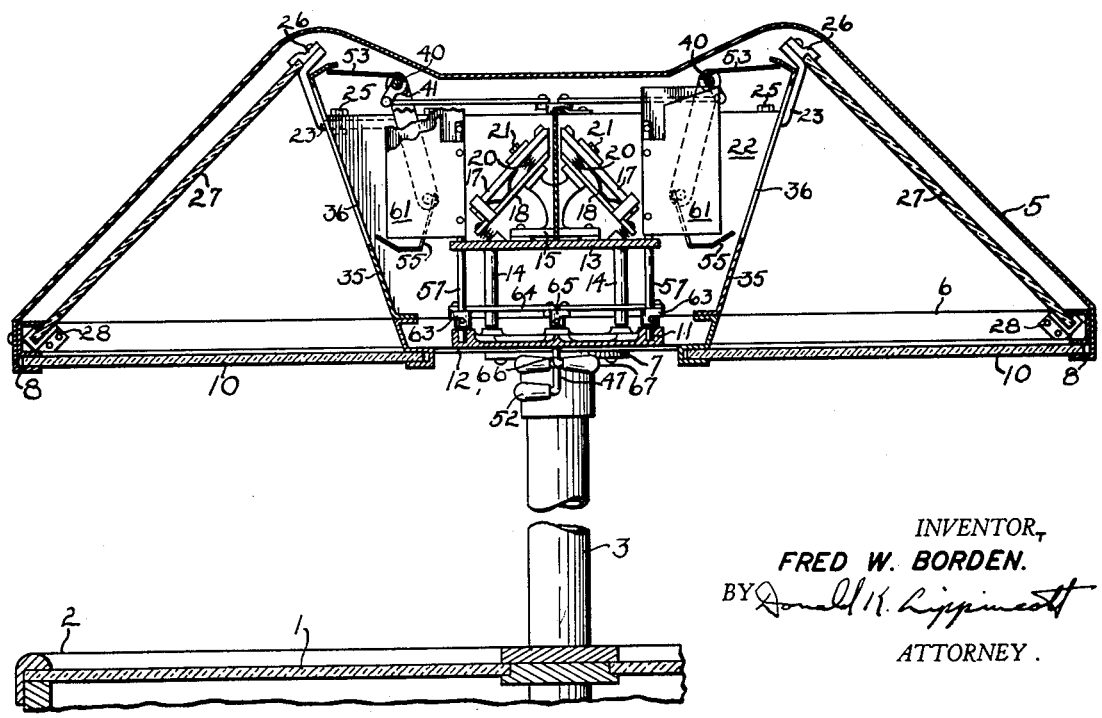
Figure 2 is a vertical cross sectional view of the stereoscope shown in Figure 1.

The embodiment of my invention which I have chosen for detailed description comprises a table 1, which is preferably a light box of the type disclosed in my copending application, Serial No. 296,529, filed July 31, 1928. Surrounding the edge of this table is a molding 2, which may be provided with graduations for facilitating the placement of the films to be examined in their correct position within the field of view of the stereoscope, the moldings themselves delimiting fields of the maximum size of film for which the stereoscope is designed.

Extending above the table is a pair of columns 3, upon which is mounted a hood 5 which encloses the stereoscopic mechanism proper.

The hood is mounted on a horizontal frame 6 to which the bracket 7 to support the hood from the columns, is attached. Immediately below the frame 6 and forming a part thereof, are channels 8 within which are held windows 10 of glass or other transparent material, through which the fields are viewed by the observer.

Also secured to the frame 6 is a casting 11 upon which the mechanism of the stereoscope is mounted, and which stiffens and reinforces the frame. A plate of metal or other opaque material 12 extends across the bottom of the hood below the frame, making this portion of the hood light tight with the exception of the window openings.

Mounted above the casting 11, on each side of the hood, is a table or platform 13 which is supported from the casting by integral legs 14. This platform carries a bracket 15 upon which two small first-surface mirrors 17 are mounted back-to-back. The mirrors are held in frames 18, which are supported from the brackets by springs 20, through which are threaded screws 21. By separately adjusting these screws the angles and positions of the mirror 17 may be accurately adjusted. These adjustments are made when the instrument is set up and are not accessible to an observer.

Extending longitudinally of the instrument, between the two sets of eyepiece mirrors 17, is a tunnel or open ended box 22. The tunnel is rigidly secured to the frame 6, and a bar 23, having ends which are bent upward and back, extends through the tunnel and is secured thereto by bolts 25. The bar 23 carries clips 26 which hold the upper edges of a pair of first-surface objective mirrors 27, which are located above the windows 10, and inclined toward each other within the hood, their lower edges being secured by clips 28, mounted on the sides of the frame 6 adjacent its ends.

The mirrors 17 are adjusted to be accurately parallel to the mirrors 27. The angle of these mirrors with the horizontal is, in the present instance, 46 and ½ degrees. The image of the fields of view as reflected in the mirrors 27 is again reflected by the mirrors 17 so that it may be seen through the glass-covered windows or eyeholes 29 which form a part of a mask 30 mounted in the hood above each pair of eyepiece mirrors.

A diaphragm 35, supported by the frame 6 and the end of the tunnel 22, is mounted between each of the objective mirrors 27 and its corresponding eyepiece mirror 17. Each of the diaphragms is pierced with apertures 36, for limiting the reflection as seen from the eyeholes to the fields of view, and thereby concentrating the attention of the observer upon those fields. There is also another partition or diaphragm 37 mounted between the mirrors 17 of each pair of eyepieces.

Both the diaphragms and the partitions prevent light from passing from one field of view, across the stereoscope within the hood, and down to the opposite window 10, where it could form a secondary reflection which would confuse the image. Such secondary reflections where they occur, are extremely confusing and greatly limit the usefulness of an instrument of this type. The openings 36 in the diaphragm, as well as the eyepiece mirrors 17, are trapezoidal in shape, each being an inclined section of a pyramid whose base is the virtual image of the field of view and whose apex is the pupil of the eye of the observer as positioned by the eyeholes 29.

Means are provided for further delimiting the field of view both in longitudinal and transverse dimensions. Horizontal shafts 40, mounted on brackets 41 above the tunnel, carry cranks 43 which are joined by links 45 to a double crank 46 on a vertical shaft 47 extending up through the vertical axis of the stereoscope. In the same manner, a shorter horizontal shaft 48 is mounted from the lower end of the same bracket 41, and may be rocked by means of similar cranks 49 and links 50 to the vertical shaft 47, which is controlled by a handle 52. Each of the shafts 40 and 48 carries a shutter 53 and 55 respectively, and the rocking of these shafts, under control of the handle 52, causes the outer ends of the shutters to approach each other, occulting the aperture 36 and thus delimiting the field of view transversely as seen by the observer.

Means are provided whereby each of the two observers may limit his own field of view in what appears to him to be its longitudinal dimension, i. e., laterally as referred to the principal dimension of the stereoscope. Vertical shafts 57 and 58 are journaled in the casting 11 and platform 13, just without the lines of sight to the extreme edges of the field of view, and on these shafts are mounted shutters 61 and 62 respectively. Cranks 63 on the shaft 57 are connected by links 64 with a double crank 65 on a short vertical shaft 66 through the bottom of the stereoscope, the latter shaft being provided with a handle 67 whereby the shutters may be adjusted. A similar arrangement comprising crank 68, links 69 and the double crank 70 on a shaft 71 permits the adjustment of the shutters 62.

It will be noted that the virtual image of any object formed by a mirror, occupies a definite position in space. Any arrangement of parallel mirrors 17 and 27, when viewed from above, will give images of a horizontal surface below the objective mirrors, and these images will lie in the same plane, parallel to the true plane of the object viewed, and regardless of the angle made by the mirrors with the horizontal, as long as this angle lies between zero and 90° and the planes of the objective and eyepiece mirrors do not coincide. The fields of view visible in such an arrangement are maximum when the angle of the mirrors is in the neighborhood of 45°, the optimum angle being a little greater than 45° owing to the fact that the images are viewed binocularly and that the lines of sight converge slightly where the image is a finite distance from the eye.

In the ordinary stereoscope, in which no effort is made to limit the fields of view, the images of the two fields will overlap in part. The ordinary stereoscope, wherein 45° mirrors are used, places the optical centers of the objective and eyepiece mirrors at the apices of right angles in the "principal ray", which joins the center of the film with the eye of the observer.

With a film so placed, the two separate images when first viewed do not appear to coincide. By a distinct muscular effort, it is possible to dissociate the accommodation of the two eyes with their convergence, and under these circumstances the two images fuse and the stereoscopic picture is seen. That is, the accommodation of the eye corresponds to a focal distance of say 26 inches; the convergence of the eyes, however, at what would be normal if an object an infinite distance away were being viewed. The muscular effort is the same as that required to produce diplopia or "seeing double".

In the stereoscope of my invention the fields of view visible in the eyepiece mirrors are rigidly restricted to the portion where the images exactly overlap, and means are provided for positioning the films exactly in the overlapping portion of the two fields. With the films thus placed, the only conscious effort is that required to focus the eyes upon an object spaced therefrom at the distance of the virtual images.

With the plane, orientation, and overlapping of the images permanently provided for in the original adjustment of the instrument, the eyes may assume their normal convergence for the distance at which they are focused, and the stereoscopic effect will at once be apparent even to an unskilled observer.

I claim:

1. A stereoscope for X-ray films comprising a horizontal viewing table for receiving a stereoscopic pair of films, guides arranged on the table for positioning each of the films thereon in a predetermined field of view, a pair of objective mirrors angularly positioned above said fields to reflect the whole of said fields, two pairs of eyepiece mirrors positioned in the median plane between said objective mirrors, means for establishing the eye positions of observers for viewing the images of said fields in each of said pairs of eyepiece mirrors, and diaphragms positioned between said eyepiece mirrors and said objective mirrors whereby only that portion of said objective mirrors reflecting said fields to the observers' positions is visible therefrom.

2. A stereoscopic for X-ray films comprising a horizontal viewing table, a hood mounted above said table, angularly disposed pairs of mirrors within the hood for superposing the images of the two halves of the table to produce a stereoscopic image of films placed thereon, eyeholes in the hood for establishing the position of an observer in viewing said image, and a partition within the hood between the mirrors to prevent secondary reflections.

3. A stereoscope for X-ray films comprising a horizontal table for receiving a stereoscopic pair of films, first-surface mirrors arranged above the table for producing superposed images of said films, a protecting hood enclosing said mirrors, said hood having transparent portions in the light-paths of said images and being otherwise opaque, and partitions within the hood for preventing secondary reflections from said transparent portions.

4. A double viewing stereoscope comprising a viewing table, guide means on said table for positioning a pair of films within predetermined fields of view, a pair of opposed inclined objective mirrors arranged to reflect said fields, two pairs of inclined eyepiece mirrors, each pair arranged to form superposed images of the images of said fields in said objective mirrors, a hood enclosing said mirrors, and shutters arranged within the hood for delimiting said fields of view as seen in each of said eyepiece mirrors.

5. A double viewing stereoscope comprising a viewing table, guide means on said table for positioning a pair of films within predetermined fields of view, a pair of opposed inclined objective mirrors arranged to reflect said fields, two pairs of inclined eyepiece mirrors, each pair arranged to form superposed images of the images of said fields in said objective mirrors, a hood enclosing said mirrors, means under a single control for delimiting in one dimension the fields of view from both sets of eyepiece mirrors, and individually controlled means for delimiting in the other dimension the fields of view from each set of eyepiece mirrors.

6. A double viewing stereoscope comprising a viewing table, guide means on said table for positioning a pair of films within predetermined fields of view, a pair of opposed inclined objective mirrors arranged to reflect said fields, two pairs of inclined eyepiece mirrors, each pair arranged to form superposed images of the images of said fields in said objective mirrors, a hood enclosing said mirrors, and a partition arranged between the eyepiece mirrors of each pair to prevent secondary reflections.

7. A stereoscope comprising a viewing table whereon a stereoscopic pair of films may be placed, a hood mounted above said table, eye-positioning means in said hood defining the apices of pyramids delimiting the light paths from the images of said fields of view, and mirrors mounted within the hood and shaped substantially as sections of said pyramids, and fixing means on said table to cause said films to coincide with the bases of the viewing pyramids.

8. A stereoscope comprising means for forming images of a stereoscopic pair of pictures fixed in predetermined relationship, said images being superposed and lying in the same plane, eye-positioning means wherefrom an observer may observe said images, and an adjustable shutter operable by the observer for limiting the fields of view to the superposed positions of said images.

FRED W. BORDEN.